United States Patent [19]
Bednar et al.

[11] Patent Number: 5,915,496
[45] Date of Patent: Jun. 29, 1999

[54] PARALLEL-SERIES FOUR-WHEEL-DRIVE HYDRAULIC CIRCUIT FOR A RIDING LAWN MOWER

[75] Inventors: Richard D. Bednar, Lake Mills; Paul E. Kinsman, Fort Atkinson, both of Wis.

[73] Assignee: Ransomes America Corporation, Lincoln, Nebr.

[21] Appl. No.: 08/787,384

[22] Filed: Jan. 22, 1997

Related U.S. Application Data

[60] Provisional application No. 60/024,579, Aug. 26, 1996.

[51] Int. Cl.$^6$ .................................................. B60K 17/00
[52] U.S. Cl. ........................................ 180/305; 180/6.48
[58] Field of Search .................................. 180/305, 307, 180/308, 6.48, 242; 56/10.8, 10.9, 11.4

[56] References Cited

U.S. PATENT DOCUMENTS

| | | | |
|---|---|---|---|
| 3,182,444 | 5/1965 | Quayle | 60/19 |
| 3,351,147 | 11/1967 | Williamson | 180/6.3 |
| 3,506,081 | 4/1970 | Rumsey | 180/44 |
| 3,788,075 | 1/1974 | Holdeman et al. | 60/424 |
| 3,940,213 | 2/1976 | Smith | 404/111 |
| 4,069,886 | 1/1978 | Campbell | 180/308 |
| 4,185,713 | 1/1980 | Williams et al. | 180/242 |
| 4,244,184 | 1/1981 | Baldauf et al. | 180/308 |
| 4,606,428 | 8/1986 | Giere | 180/307 |
| 4,883,141 | 11/1989 | Walker | 180/308 |
| 4,947,956 | 8/1990 | Henline | 180/235 |
| 5,533,325 | 7/1996 | Sallstrom et al. | 56/7 |

FOREIGN PATENT DOCUMENTS

| | | |
|---|---|---|
| 0 301 896 | 5/1989 | European Pat. Off. . |
| 2 709 454 | 10/1995 | France . |
| 95/21069 | 8/1995 | WIPO . |

*Primary Examiner*—Richard M. Camby
*Attorney, Agent, or Firm*—Michael Best & Friedrich LLP

[57] ABSTRACT

A parallel-series four-wheel-drive hydraulic circuit for a riding lawn mower. The lawn mower includes first and second hydraulic circuits. The first hydraulic circuit comprises a first hydraulic motor drivingly connected to a first wheel, a second hydraulic motor drivingly connected to a second wheel, a hydraulic pump connected in series with said first and second hydraulic motors, and a first fluid path allowing recirculation of hydraulic fluid through the second motor so that the speed of the second motor can increase relative to the speed of the first motor. Correspondingly, the speed of the second wheel can increase relative to the speed of the first wheel. A first conduit communicates between the first and second motors, a second conduit communicates between the second motor and the pump, and the fluid path communicates between the first and second conduits. The fluid path includes a check valve preventing reverse fluid flow through the fluid path from the first conduit to the second conduit. The second hydraulic circuit similarly connects the third and fourth motors and is connected in parallel with the first hydraulic circuit.

11 Claims, 2 Drawing Sheets

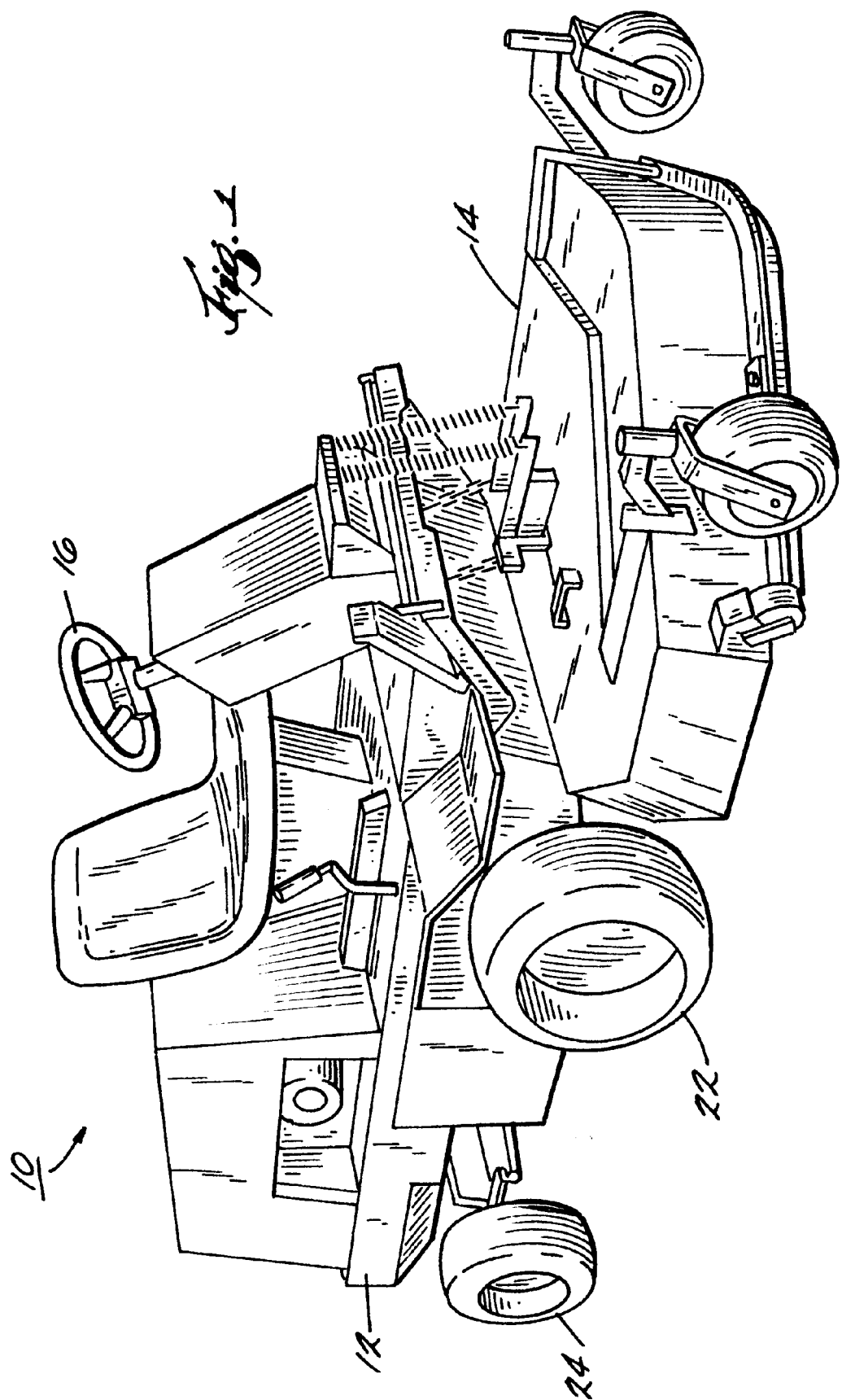

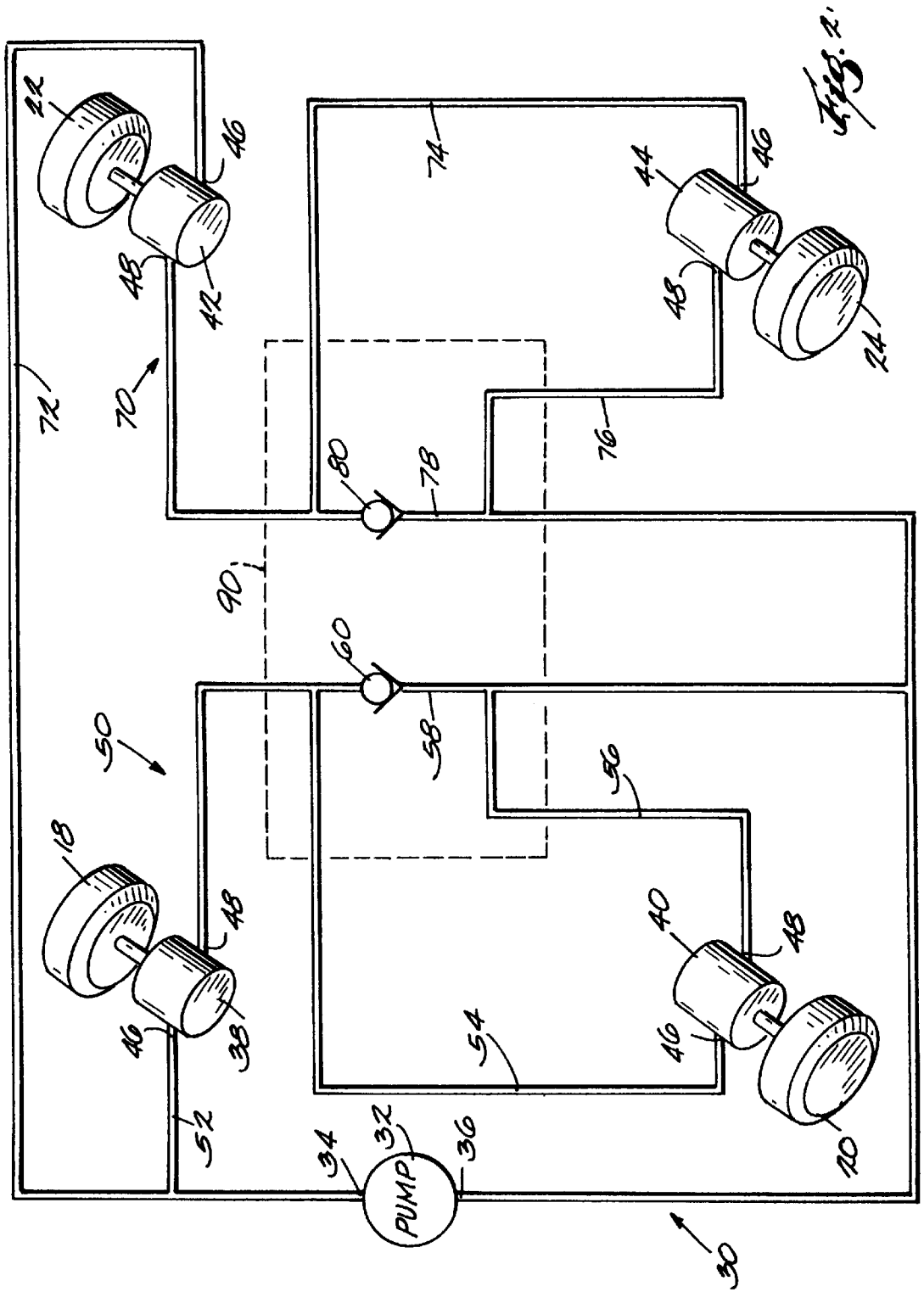

PARALLEL-SERIES FOUR-WHEEL-DRIVE HYDRAULIC CIRCUIT FOR A RIDING LAWN MOWER

This application claims benefits of Provisional Application 60/024,579 Aug. 26, 1996.

BACKGROUND OF THE INVENTION

A known type of riding lawn mower has the four wheels driven by respective hydraulic motors, with the rear wheels steering the lawn mower. When the lawn mower is traveling in a straight line, all four wheels move along the ground at the same speed (although the rotational speed of the rear wheels may be greater because the rear wheels are smaller). When the lawn mower is turning, however, the wheels do not move along the ground at the same speed. For example, when the lawn mower is turning to the left, the right front wheel moves faster than the left front wheel, due to the greater distance from the center of the turn, and the right rear wheel moves faster than the left rear wheel, for the same reason. Broadly stated, the outside wheel in a turn must move faster than the corresponding inside wheel.

Furthermore, because the rear wheels are turning, the distance from the left rear wheel to the center of the turn is greater than the distance from the left front wheel to the center of the turn, and the distance from the right rear wheel to the center of the turn is greater than the distance from the right front wheel to the center of the turn. Consequently, the steering left rear wheel moves faster than the non-steering left front wheel, and the steering right rear wheel moves faster than the non-steering right front wheel.

The opposite is true for a front-wheel-steering vehicle. That is, in a turn, the left front wheel moves faster than the left rear wheel, and the right front wheel moves faster than the right rear wheel. Broadly stated, the left steering wheel moves faster than the left non-steering wheel, and the right steering wheel moves faster than the right non-steering wheel.

To accommodate an increased speed of a wheel in a turn, whether the wheel is an outside wheel or a steering wheel, the hydraulic motor associated with the faster moving wheel must operate at a faster rate. To do so, this hydraulic motor requires more hydraulic fluid than the hydraulic motor associated with the slower moving wheel requires.

In a conventional lawn mower, all four hydraulic motors are connected in parallel, which will allow for the difference in speed. However, if any one wheel loses traction, all fluid flows to that wheel, causing the lawn mower to stop moving.

If the hydraulic motors are arranged in a series circuit, the hydraulic motor associated with the wheel which must move faster in a turn does not itself operate faster, the associated wheel, in an effort to rotate faster, will exert pressure on the motor. The rotation of the associated wheel will be impeded by the motor, and, because the wheel is not rotating faster, the wheel will be dragged by the other wheel, which can move slower because this other wheel is on the inside of the turn or is a non-steering wheel.

SUMMARY OF THE INVENTION

To overcome these problems, the invention provides a hydraulic circuit comprising a first hydraulic motor, a second hydraulic motor, a hydraulic pump connected in series with said first and second hydraulic motors and a fluid path or, in the alternative, recirculation means allowing recirculation of hydraulic fluid through the second motor so that the speed of the second motor can increase relative to the speed of the first motor. In a preferred embodiment, a first conduit communicates between the first motor and the second motor, a second conduit communicates between the second motor and the pump, and the fluid path communicates between the first and second conduits. The fluid path preferably includes a check valve which prevents reverse fluid flow through the fluid path, from the first conduit to the second conduit.

More particularly, the invention provides a parallel-series four-wheel-drive hydraulic system for a vehicle of the type described above. However, the invention is applicable to other types of vehicles and to front-steering or two-wheel-drive vehicles. In the preferred embodiment, the hydraulic motors for the left front and rear wheels and are connected in a series circuit, and the hydraulic motors for the right front and rear wheels are connected in another series circuit. These circuits are connected in parallel. Each circuit includes an arrangement that allows the left or right steering wheel to move faster than the corresponding left or right non-steering wheel in a turn. The parallel arrangement of the circuits allows the outside wheel in a turn to move faster than the corresponding inside wheel, as is required for the outside wheel to cover a greater distance. This arrangement also permits one or two wheels to lose traction without stopping the vehicle, because the series portion of the circuit will still drive the remaining wheels.

The invention allows the hydraulic motor associated with a faster moving wheel to operate at faster rate by recirculating hydraulic fluid through this motor. This reduces the stress that the wheel, in an effort to rotate faster, exerts on the motor and enables this wheel to keep pace with its slower moving counterpart so that the wheel is not dragged through the turn.

Other features and advantages of the invention will become apparent to those skill in the art upon review of the following detailed description, claims and drawings.

DESCRIPTION OF THE DRAWINGS

FIG. 1 is a perspective view of a lawn mower embodying the present invention.

FIG. 2 illustrates a hydraulic circuit of the lawn mower.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A rear-steering, four-wheel-drive lawn mower 10 embodying the invention is illustrated in FIG. 1. It should be understood that the invention is applicable to other types of vehicles and to front-steering or two-wheel-drive vehicles.

The lawn mower 10 comprises (see FIGS. 1 and 2) a frame 12 supported by wheels 18, 20, 22 and 24 for movement over the ground. The front wheels 18 and 22 and the rear wheels 20 and 24 may be of different sizes, as shown, or of the same size.

The lawn mower 10 further comprises an engine (not shown). The engine may be any type known in the art, such as a gasoline-powered, internal combustion engine.

The lawn mower 10 further comprises a cutting deck 14 which is supported on the frame 12. The deck 14 supports a plurality of cutting blades (not shown). The blades may be driven by any conventional means, such as by the engine. In the illustrated construction, each blade is driven by a hydraulic motor (not shown).

The lawn mower 10 further comprises a conventional steering system including a steering wheel 16. In the illustrated construction, the steering system is hydraulically-operated and is connected to the rear wheels 20 and 24 to steer the lawn mower 10.

The lawn mower 10 further comprises a hydraulic system 30, shown in FIG. 2. The system 30 includes a bi-directional hydraulic pump 32 having opposite ports 34 and 36. The pump 32 may be driven by any conventional means. In the illustrated construction, the pump 32 is driven by the engine.

The system 30 further includes hydraulic motors 38, 40, 42, and 44, each having opposite ports 46 and 48. The motors 38, 40, 42, and 44 are drivingly connected to the wheels 18, 20, 22, and 24, respectively.

The system 30 also includes a first or left hydraulic circuit 50, associated with the hydraulic motors 38 and 40, and a second or right hydraulic circuit 70, associated with the hydraulic motors 42 and 44. In other embodiments, such as two-wheel-drive, only one hydraulic circuit may be necessary.

In the first hydraulic circuit 50, the pump port 34 is connected to the port 46 of the motor 38 by a conduit 52. The port 48 of the motor 38 is connected to the port 46 of the motor 40 by a conduit 54, and the port 48 of the motor 40 is connected to the port 36 of the pump 32 by a conduit 56. A recirculation conduit 58 connects the conduits 54 and 56. A check valve 60 is included in the recirculation conduit 58. The check valve 60 allows fluid to flow through the recirculation conduit 58 from the conduit 56 to the conduit 54. The check valve 60 prevents fluid from flowing through the recirculation conduit 58 from the conduit 54 to the conduit 56.

In the forward drive mode, hydraulic fluid flows through first hydraulic circuit 50 from the pump 32 to the motor 38 through the conduit 52, flows from the motor 38 to the motor 40 through the conduit 54, and flows from the motor 40 back to the pump 32 through the conduit 56. Fluid can recirculate through the recirculation conduit 58 and through the motor 40 without returning to the pump 32. This allows the speed of the rear motor 40 to increase relative to the speed of the front motor 38. The check valve 60 prevents reverse fluid flow through the conduit 58, i.e., in the direction towards the conduit 56. The check valve 60 thus prevents fluid from bypassing motor 40.

Similarly, in the second hydraulic circuit 70, the pump port 34 is connected to the port 46 of the motor 42 by a conduit 72. The port 48 of the motor 42 is connected to the port 46 of the motor 44 by a conduit 74, and the port 48 of the motor 44 is connected to the port 36 of the pump 32 by a conduit 76. A recirculation conduit 78 connects the conduits 74 and 76. A check valve 80 is included in the recirculation conduit 78. The check valve 80 allows fluid to flow through the recirculation conduit 78 from the conduit 76 to the conduit 74. The check valve 80 prevents fluid from flowing through the recirculation conduit 78 from the conduit 74 to the conduit 76.

In the forward drive mode, hydraulic fluid flows through second hydraulic circuit 70 from the pump 32 to the motor 42 through the conduit 72, flows from the motor 42 to the motor 44 through the conduit 74, and flows from the motor 44 back to the pump 32 through the conduit 76. Fluid can recirculate through the recirculation conduit 78 and through the motor 44 without returning to the pump 32. This allows the speed of the rear motor 44 to increase relative to the speed of the front motor 42. The check valve 80 prevents reverse flow through the conduit 78, i.e., in the direction toward the conduit 76. The check valve 80 thus prevents fluid from bypassing motor 44.

The first hydraulic circuit 50 and the second hydraulic circuit 70 are connected in parallel. In normal operations, the pump 32 provides hydraulic fluid equally to the first hydraulic circuit 50 and to the second hydraulic circuit 70.

In the preferred embodiment, the recirculation conduits 58 and 78, the check valves 60 and 80, and portions of the conduits 54, 56, 74 and 76 are all included in a single valve block 90.

In operation, when the lawn mower 10 is driven in a straight line, the pump 32 provides hydraulic fluid equally to the first hydraulic circuit 50 and the second hydraulic circuit 70 and equally to each motor 38, 40, 42 and 44. In this straight-driving operation, each wheel 18, 20, 22 and 24 moves along the ground at the same speed (though the rotational speed of the rear wheels 22 and 24 is greater because the wheels 22 and 24 are smaller).

When the operator turns the lawn mower 10, the rear wheels 20 and 24 are turned. Because the rear wheels 20 and 24 are turning, the distance from the rear wheels 20 and 24 to the center of the turn is greater than the distance from the front wheels 18 and 22 to the center of the turn. Consequently, the rear wheels 20 and 24 must move faster than the front wheels 18 and 22.

To accommodate the increase in the speed of the steering wheels 20 and 24, more hydraulic fluid must flow through the motors 40 and 44 associated with the faster moving steering wheels 20 and 24 than through the motors 38 and 42 associated with the slower moving non-steering wheels 18 and 22. In both hydraulic circuits 50 and 70, the recirculation conduits 58 and 78 and the check valves 60 and 80 allow hydraulic fluid to recirculate through the motors 40 and 44 without the fluid returning to the pump 32. This recirculation increases the amount of fluid flowing through the motors 40 and 44 relative to that flowing through the motors 38 and 42, respectively, and allows the motors 40 and 44 to operate faster than the motors 38 and 42, respectively.

Various features of the invention are set forth in the following claims.

We claim:

1. A hydraulic circuit comprising
    a first hydraulic motor;
    a second hydraulic motor;
    a hydraulic pump connected in series with said first and second hydraulic motors; and
    a fluid path allowing recirculation of hydraulic fluid through said second motor before returning to said pump so that the speed of said second motor can increase relative to the speed of said first motor.

2. A hydraulic circuit as set forth in claim 1 wherein said fluid path includes a check valve preventing reverse fluid flow through said fluid path.

3. A hydraulic circuit as set forth in claim 1 wherein said circuit further comprises a first conduit communicating between said first motor and said second motor, and a second conduit communicating between said second motor and said pump, and wherein said fluid path communicates between said first and second conduits.

4. A vehicle comprising
a first wheel;
a second wheel; and
a hydraulic circuit comprising;
　a first hydraulic motor drivingly connected to said first wheel;
　a second hydraulic motor drivingly connected to said second wheel;
　a hydraulic pump connected in series with said first and second hydraulic motors; and
　a fluid path allowing recirculation of hydraulic fluid through said second motor before returning to said pump so that the speed of said second motor can increase relative to the speed of said first motor, whereby the speed of said second wheel can increase relative to the speed of said first wheel.

5. A vehicle as set forth in claim 4 wherein said fluid path includes a check valve preventing reverse fluid flow through said fluid path.

6. A vehicle as set forth in claim 4 wherein said circuit further comprises a first conduit communicating between said first motor and said second motor, and a second conduit communicating between said second motor and said pump, and wherein said first fluid path communicates between said first and second conduits.

7. A vehicle as set forth in claim 6 further comprising
a third wheel;
a fourth wheel; and
a second hydraulic circuit connected in parallel to said first-mentioned hydraulic circuit, said second hydraulic circuit comprising;
　a third hydraulic motor drivingly connected to said third wheel;
　a fourth hydraulic motor drivingly connected to said fourth wheel;
　a hydraulic pump connected in series with said third and fourth motors;
　a third conduit communicating between said third motor and said fourth motor;
　a fourth conduit communicating between said fourth motor and said pump; and
　a second fluid path allowing recirculation of hydraulic fluid through said fourth motor before returning to said pump so that the speed of said fourth motor can increase relative to the speed of said third motor, whereby the speed of said fourth wheel can increase relative to the speed of said third wheel, said second fluid path communicating between said third and fourth conduits and including a check valve preventing reverse fluid flow through said second fluid path from said third conduit to said fourth conduit.

8. A hydraulic circuit comprising
a first hydraulic motor;
a second hydraulic motor;
a hydraulic pump connected in series with said first and second motors; and
recirculation means for allowing recirculation of hydraulic fluid through said second motor before returning to said pump so that the speed of said second motor can increase relative to the speed of said first motor.

9. A hydraulic circuit as set forth in claim 8 wherein said recirculation means includes a recirculation fluid path.

10. A hydraulic circuit as set forth in claim 8 wherein said recirculation means includes a check valve preventing reverse fluid flow through said recirculation means.

11. A hydraulic circuit as set forth in claim 8 wherein said hydraulic circuit further includes a first conduit connecting said first and second motors, and a second conduit connecting said second motor and said pump, and wherein said recirculation means includes a fluid path which communicates between said first and second conduits.

* * * * *